April 10, 1962 C. W. BURKLAND Re. 25,157

TUB ASSEMBLY

Original Filed June 27, 1955 2 Sheets-Sheet 1

Inventor
Charles W. Burkland
by James S. Nettleton
Attorney

TUB ASSEMBLY

Original Filed June 27, 1955 2 Sheets-Sheet 2

Inventor
Charles W. Burkland
by James S. Nettleton
Attorney

United States Patent Office

Re. 25,157
Reissued Apr. 10, 1962

BEST AVAILABLE COPY 25,157
TUB ASSEMBLY

Charles W. Burkland, Newton, Iowa, assignor to The Maytag Company, Newton, Iowa, a corporation of Delaware Original No. 2,942,445, dated June 28, 1960, Ser. No. 518,163, June 27, 1955. Application for reissue Sept. 15, 1961, Ser. No. 139,822
12 Claims. (Cl. 68—23)

Figure 1:
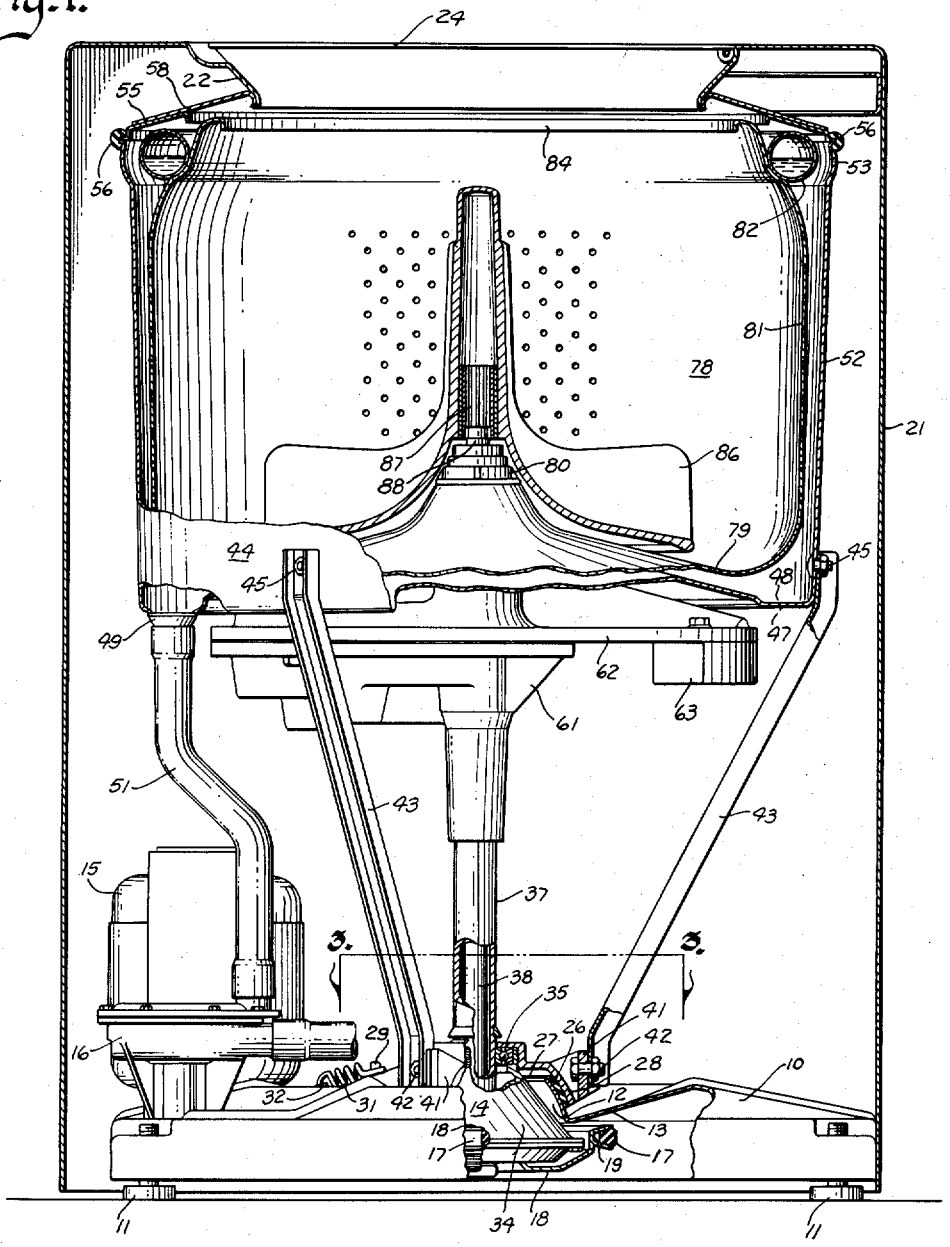

Matter enclosed in heavy brackets [ ] appears in the original patent but forms no part of this reissue specification; matter printed in italics indicates the additions made by reissue.

This invention relates to an improved tub assembly for an automatic washing machine of the vertical axis type. In the Thomas R. Smith Patent No. 2,645,108, entitled Combined Washing Machine and Centrifugal Fluid Extractor, and issued July 14, 1953, to the same assignee as that of this application, there is disclosed one tub assembly for a combination washing machine and fluid extractor. In that patent disclosure an outer imperforate tub and a cooperating perforate basket nested within the tube are both affixed to a gear housing connected to a spin tube mounted for nutational movements about its lower end. During periods of agitation, the tub and basket are restrained against rotation while an agitator driven by a shaft journalled within the spin tube produces the necessary degree of agitation of the fluids and fabrics within the stationary tub assembly. During spin periods, the double tub assembly formed from the tub and basket is released for rotation and the outer tub, inner basket, agitator and gear housing are all spun in unison at centrifuging speeds to extract the fluids from the fabrics within the tub assembly.

This prior type assembly produces excellent results for removing excess moisture from the fabrics during the spin-dry period by extracting the liquids outwardly through the perforate basket wall and against the vertical wall of the imperforate outer tub where the extracted fluids pass up and over the upper edge of the outer tub without passing through the fabrics and recontaminating them during this extraction period.

Though this type of double tub construction has produced better results than a single tube provided with fluid escape ports, it has two distinct disadvantages. One of these disadvantages is that this type tub assembly necessitates the use of an outer tub basin enclosing the tub assembly to catch the extracted fluids once they have passed over the upper edge of the outer imperforate tub in order to pass these fluids on to an external drain. The second disadvantage of this prior type double tub assembly is that not all of the heavier particles of sand and sediment separated from the soiled fabrics and settling between the basket and tub are always extracted from the tub during the fluid extraction process. Unlike the smaller particles of sediment flushed from the assembly, some of the heavier particles remained within the tub assembly and were not flushed over the upper edge of the outer tub because of the action of the centrifugal forces pressing them outwardly against the vertical wall of the outer tub.

This invention therefore has as one of its prime objects the elimination of the necessity for use of an outer tub basin surrounding the tub assembly.

The second object of this invention is to produce a satisfactory tub assembly capable of efficiently extracting fluids from fabrics during the spin-dry period while permitting sand and heavy sediment settling to the bottom of the tub assembly during the agitation periods to be thoroughly removed from the tub assembly before the end of each spin cycle so as to prevent recontamination of fabrics in subsequent operating cycles.

Another object is to produce a tub assembly in which the power housing containing the motion converting mechanism which drives the agitator within the assembly may be affixed directly to the spin tube to utilize the mass of the power housing and its mechanism to stabilize the lateral deviations of the spinning assembly during the centrifuging operation.

An additional object of this invention is to produce a tub assembly by supporting an imperforate tub entirely on a resiliently centered friction damper member to permit the tub to nutate about its vertical axis without rotating with a perforate basket which is nested within the tub and connected to a rotatable spin shaft journalled in the damper member.

Figure 2:
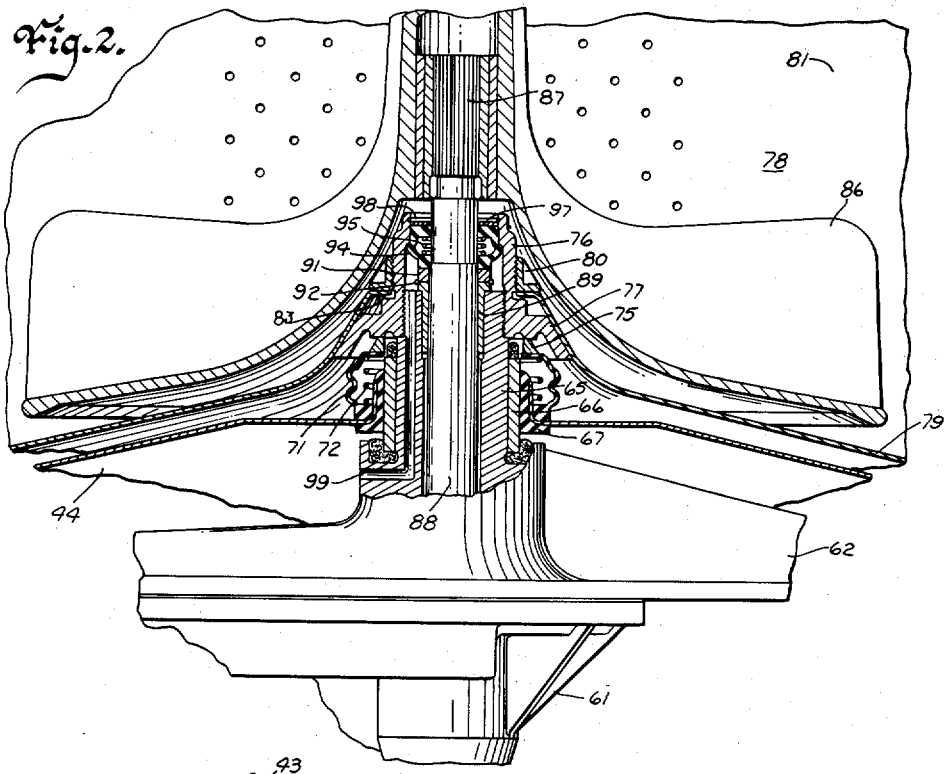
Figure 3:
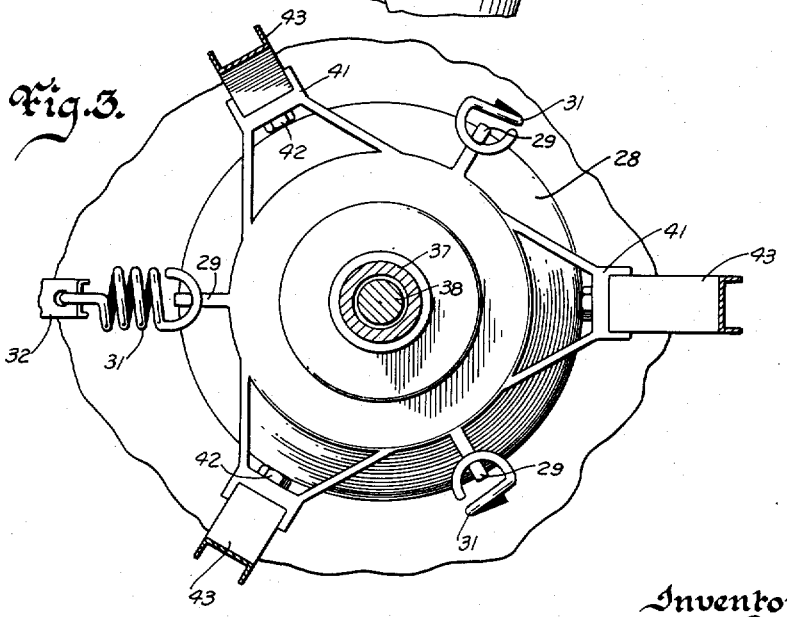

Other objects, advantages and features of this invention will be more apparent when reference is made to the following specification and drawings in which:

FIGURE 1 is an elevation, partially in section, of a washing machine embodying my invention;

FIGURE 2 is an enlarged fragmentary elevational view, partially broken away, showing the method of supporting the perforate basket on the vertical spin tube, and FIGURE 3 is a view taken on line 3—3 of FIGURE 1 showing the resiliently centered umbrella damper member journalling the spin tube and those lower connections of the brace members supporting the non-rotatable imperforate tub on the umbrella member.

In the accompanying drawings there is shown a base member 10 mounted on adjustable feet 11 and provided with a supporting dome 12 rising out of a centrally located depression 13 in the base frame 10. Dome 12 serves as a mounting for a drive assembly 14 such as that disclosed in the John D. Goodlaxson application Serial No. 505,231, filed May 2, 1955, and assigned to the same assignee as that of the instant application.

Base frame member 10 also supports the upended reversible motor 15 and water pump 16 which, like drive assembly 14, is driven by motor 15 through belt 17 on the underside of base frame 10. Numeral 19 designates the groove of pulley 18 which serves as the input member for drive assembly 14.

Cabinet 21, attached to and enclosing base 10 together with the drive and tub assemblies supported thereby, is provided at its upper end with a depending annular flange 22 defining an access opening into the washing machine apparatus which is normally covered by access door 24.

In FIGURE 1 it can be seen that dome 12 in base member 10 is provided with friction pads 26 on its periphery adjacent the aperture 27 in its uppermost portion.

An umbrella-like support member 28 rests on these friction pads 26 and is provided with three equally spaced ears 29 for three centering springs 31 which may be attached directly to base frame 10 or fastened to brackets 32 connected to the base frame 10. This arrangement which centers support member 28 on dome 12 and restrains it from rotation forms part of the subject matter disclosed and claimed in the co-pending application Serial No. 505,251, filed May 2, 1955, now Patent No. 2,854,297, naming William F. Scott and Arthur W. Vondehaar as co-inventors and assigned to the same assignee as that of this application.

Threaded into the umbrella support member 28 is member 34 of substantially frusto-conical configuration which serves as a housing for drive assembly 14 of the previously identified Goodlaxson application Serial No. 505,231, *now Patent No. 2,948,372*. Housing member 34 cooperates with the umbrella support member 28 by gripping the outer race of a thrust bearing 35 which is provided with a tapered inner race. Mating with and seated in this tapered inner race of bearing 35 is the spin tube or shaft 37 which journals a power shaft 38 also extending the drive assembly 14. With this construction all ht placed on the spin tube 37, housing 34 and on rella member 28 may be used to an advantage to ide ample frictional force between umbrella member and the friction pads 26 for dampening nutational ements of the shafts 37 and 38 relative to dome 12 e permitting rotational movement of spin tube 37 in st bearing 35.

'hile the details of the Goodlaxson drive assembly ing the basis for the previously identified application al No. 505,231 are not essential to the construction he instant invention, its operation can be briefly exned for environmental purposes. Upon energiza- of motor 15 in a direction to rotate pulley 18 in a ter-clockwise direction as viewed from the bottom 'IGURE 1, power shaft 38 is rotated in this same diion while spin shaft 37 is held against rotation by opriate braking mechanism within housing 34. Upon reversal of motor 15, spin shaft 37 is released for tion to allow both of shafts 37 and 38 to be spun nison in a clockwise direction.

'ith the drive and support construction set forth above, an be seen that shafts 37 and 38 may be selectively ted as determined by the direction of rotation imed to pulley 18 while permitting their nutation about rtical axis at all times. In the modification set forth he accompanying drawings, shafts 37 and 38 nutate a point determined by the intersection of the vertical of rotation with the horizontal plane bisecting groove of pulley 18.

low with reference to the tub assembly forming the ntion of the instant application, it can be seen from IURES 1 and 3 that umbrella support member 28 is vided with three upstanding lugs 41 of channel-like s section spaced equally from each other and alternateround member 28 with respect to the ears 29. Fased within the grooved lugs 41 by connectors 42 are the e tube brace members 43 which are, in this embodiat, also of channel-like cross section. Brace members extend outwardly and upwardly from umbrella support mber 28 to join the non-rotatable tub 44 through tub nectors 45. The tub 44 is provided with a bottom wall in which is formed a C-shaped gutter 48 having its ermost portion converging into the drain outlet 49 ich in turn communicates with water pump 16 through ible drain hose 51. The imperforate cylinder sidell 52 of tub 44 includes a slightly enlarged rim 53 on uppermost portion before terminating in an outwardly ected flange. Resting on the flanged upper edge of ewall 52 is spherical segmental member 55 having a ged periphery and a rolled inner edge. Member 55 ms a water-tight seal with wall 52 as these members gripped by the rubber sealing band 56 encompassing peripheral flanges of wall 52 and the segmental mem- 55. Resting on the upper surface of member 55 and ring its inner cylindrical portion fastened to the outer iphery of the depending flange 22 is the combined ter and vapor seal 58 which prevents the escape of her steam or water from tub 44 during normal use the machine utilizing this invention. This specific flexe vapor seal is described and claimed in the co-pending plication of Thomas R. Smith and William F. Scott, rial No. 518,286, now Patent No. 2,777,314, filed of en date herewith and assigned to the same assignee as at of this application.

Since the described vapor seal forms no part of this vention, it naturally follows that other types of sealing rangements may be provided for the upper portion of s tub assembly.

Referring now to FIGURES 1 and 3, it can be seen that in tube 37 extends upwardly from drive assembly 14 connect with the lower extension of lower power hous- g cover 61. The upper power housing cover 62 to ich is attached a counter-weight 63 cooperates with ver 61 to form a power housing enclosing a conventional type motion converting mechanism which is driven by power shaft 38 in order to convert the rotary movement of power shaft 38 into the oscillatory output movement now common in the washing machine art.

Now with reference to FIGURE 2 showing the enlarged sectional details of a tub assembly utilizing my invention, it will be noted that the upper power housing cover 62 carries an integral upper extension forming the stub shaft 65 which is coaxial with the rotational axis of shafts 37 and 38. The stub shaft 65 pierces the center of bottom wall 47 through a self-aligning radial bearing 66 which is formed from a split cylindrical sleeve provided with a Babbitt liner and fitted into the flanged opening in the bottom wall 47 by a squeeze fit with the tubular rubber member 67 bonded to the periphery of the cylindrical sleeve 66. If desired, wicking material may be provided at the opposite ends of bearing 66 for oil storage.

Since there is relative movement between the stationary non-rotating tub 44 and the stub shaft 65, tub 44 is provided with a bellows type seal 71 pressed against the bottom wall 47 by means of coil spring 72 within that seal. The uppermost portion of bellows type seal 71 is fitted with a carbon nose sealing ring 75 which is pressed upwardly by coil spring 72 against the lower side of the tubular basket mounting stem 76 which is threaded onto the upper end of stub shaft 65.

Basket mounting stem 76 includes a frusto-conical shoulder 77 which supports the basket 78 having a bottom wall 79 and a side wall 81. Bottom wall 79 is perforate at its lowest elevation for passage of liquid and sediment into tub 44 and has a slope conforming substantially to bottom wall 47 of that outer tub. Side wall 81 includes a main perforate cylindrical portion and an upper imperforate portion which slopes inwardly towards its axis of rotation to form a seat for balancing ring 82 within rim 53 before terminating in rolled edge 84 which defines the access opening into the tub assembly.

While the weight of basket 78 is mainly supported on the mounting flange 77, basket 78 is prevented from tipping, tilting or turning on that flange by means of the large nut 80 which is threaded on the upper part of basket mounting stem 76 in order to wedge the conical portion of wall 79 against flange 77. In addition to wedging basket 78 on flange 77, nut 80 forces the centrally located horizontal flange 83 against a small sealing gasket immediately below the latter flange to provide an airtight seal between basket wall 79 and basket mounting stem 76.

The necessary degree of agitation of the washing fluid within basket 78 is achieved by use of the conventional agitator 86 which is fitted on splines 87 of the rock shaft 88. Shaft 88, in this embodiment, is driven by the conventional motion mechanism enclosed between the power housing covers 61 and 62.

Agitator shaft 88 is journalled in the bearing 89 which in turn is seated in the upper end of stub shaft 65. Shaft 88 is prevented from any downward movement relative to bearing 89 by means of the collar 91 pressed onto shaft 88. O-ring seal 92 encompassing the junction of parts 89 and 91 provides one shaft seal used in this construction.

A second shaft seal takes the form of a hollow member of rubber or other resilient material having its lower end urged against collar 91 by the coil spring 95 within seal 94. The upper end of seal 94 is pressed against a washer 97 maintained in its position at the mouth of the basket mounting member 76 by means of an expansible C-ring 98 engaging a mating annular groove within the mouth of member 76. Drain port 99 communicating with the space around seal 94 allows the escape of fluids which possibly may seep through that sealing member.

A machine incorporating this tub assembly may be easily serviced without the interference of any bulky framework which has been characteristic of some of the domestic washing machines placed on the market. When this tub assembly is placed in a cabinet having a removable top, agitator 86, basket 78 and tub 44 may all be quickly withdrawn from the top of the cabinet by merely loosening the vapor seal, drain hose, basket and tub connections.

In operation, over typical agitation and spin periods, the fabrics to be cleaned are inserted into basket 78 through the access openings defined by depending flange 22 and the rolled edge 84. A suitable detergent is added to the water placed within the tub 44 by a water supply system not forming a part of this invention. Though a valve may be used in the drain hose 51 to prevent the washing fluids from draining from the tub 44, the water may be retained within tub 44 in this illustrated embodiment by merely maintaining the external drain hose (not shown) attached to the outlet of pump 16 at a higher elevation than the elevation of the water contained in tub 44.

During the tub filling period when the liquid rising within the tub 44 has covered the perforations in the sloping basket bottom wall 79, air will be trapped between the bottom walls 79 and 47 due to the sealing action of the bellows type seal 71 and the air-tight connection between basket 78 and the basket mounting stem 76. This normally prevents fluids from contacting the bellows seal 71 or the large nut 80 holding basket 78 in place. Likewise, when the liquid level rises above the lower edge of agitator 86, air is normally trapped beneath this agitator to prevent liquids from contacting either seal 94 or nut 80.

When the tub 44 has been filled with a sufficient quantity of washing fluid, the reversible motor 15 is energized through a control system (not shown) to rotate the drive pulley 18 in a counter-clockwise direction as viewed from the bottom of FIGURE 1. Rotation of pulley 18 in this direction imparts the same direction of rotation to power shaft 38 while the braking mechanism (not shown) within drive assembly 14 restrains the spin tube 37 against rotation with power shaft 38. The rotation of the power shaft 38 is changed into an oscillatory movement by the motion converting unit enclosed by covers 61 and 62 to oscillate rock shaft 88 and its affixed agitator 86.

The oscillating action of agitator 86 forces the cleaning fluid through the fabrics within basket 78 and separates impurities held by them. The larger and heavier particles such as sand and sediment fall to the bottom of basket 78 where they pass through the holes in the bottom basket wall 79 in the lowermost portion of that wall. This agitation of fluids within tub 44 also causes these heavier particles to work their way down the sloping tub wall 47 and into the gutter 48 around the periphery of that bottom wall. Once in this gutter, these particles continue to seek a lower elevation in the agitated fluid and eventually find their way into the deepest part of gutter 48 where they pass into the drain outlet 49 and then into the drain hose 51.

Upon completion of the agitation cycle and the initiation of the spin or liquid extraction period, motor 15 is reversed causing the water pump 16 and the drive assembly pulley 18 to reverse their directions also. When driven in this direction, water pump 16 is permitted to pump the washing fluid together with the accumulation of [said] *sand* and sediment from tub 44 through its drain connections. This reversal of motor 15 also causes the braking mechanism within drive assembly 14 to release the spin tube 37 for rotation in unison with power shaft 38. Rotation of the spin tube 37 imparts a similar rotary movement to the power housing covers 61 and 62 and to the perforate basket 78 connected to these members through basket mounting stem 76. Note here that spin tube 37, stub shaft 65 and mounting stem 76 are in effect a single unitary shaft. While these rotating members are maintained in balance above the critical speed of this apparatus by means of the balancing ring 82, it should be noted that lateral deviation of basket 78 with respect to the non-rotating outer tub 44 is prevented by the self-aligning radial bearing 66.

In addition it should be noted that when pump 16 and the drive assembly 14 are stopped and immediately reversed and driven together, as possible in this illustrated embodiment, some water will be present in the tub assembly during the initial liquid extraction operation. Depending upon the torque input to the spin tube 37, certain drag forces will be exerted by the water within the tub 44 and the rotating basket 78 and may be utilized to prevent the basket 78 from immediately coming up to speed until enough of the washing fluid has been emptied from the [tube] *tub* 44 so as to insure that no water will attempt to pass out of the upper end of tub 44 during the spin process. In this way all water extracted from the fabrics within basket 78 passes through the sides and bottom of basket 78 and down into the drain hose 51 to flush all impurities down drain 49. Thus, while it possesses the extraction efficiency of the centrifugal extractor of the aforesaid Smith Patent No. 2,645,108, this improved tub assembly gains the advantage of removing through the bottom of the tub assembly those heavier particles which were difficult to pass over the upper sides of that prior type of [tube] *tub* assembly.

At the end of the spin-dry operation motor 15 is stopped causing the drive assembly 14 to quickly terminate the rotation of both shafts 37 and 38. Though these periods may be repeated and rinse periods, added, this terminates the spin period of my illustrated operational cycle.

While I have illustrated the operation of my tub assembly in cooperation with a reversible drive assembly, other types of drive assemblies may be used. Furthermore, while this tub assembly incorporates the use of a conventional type agitator which imparts oscillatory movement to clothes and fluids within the tub assembly and uses the power housing as a stabilizer, it should be apparent that other types of agitators may be used in conjunction with the [tube] *tub* assembly disclosed herein. This would include the elimination of the conventional oscillating type agitator and the power housing necessary to produce such an oscillatory movement and the substitution therefore of a single tube connected integrally with the basket mounting stem and provided with bearings for journalling a single power shaft for actuating agitators of the rotary or reciprocating type.

The advantages of this construction set forth herein are several. The use of this non-rotating imperforate tub eliminates the necessity of an outer tub basin and retains the advantages of the efficient fluid extractor set forth in the aforesaid Smith Patent No. 2,645,108. In addition to supporting the non-rotating imperforate tub on the umbrella damper member to utilize the weight of the tub and its contents as an aid in dampening the nutational movements of the entire [tube] *tub* assembly, I have provided a tub assembly which can be supported independently of the shaft structure actuating either the basket or the agitator within the basket. Furthermore, the connections between the non-rotating outer tub and the umbrella damper member prevent any tendency of that tub from rotating with the basket during the spin period while simultaneously permitting the entire tub assembly to nutate on the base frame member under unbalanced conditions all without placing any great stresses on the normally flexed drain hose member connected to that tub.

Though only one embodiment of my invention has been shown in the accompanying drawings, it is understood that modifications of this embodiment may be made without departing from the scope of my invention as set forth in the following claims.

I claim:

1. In a washing machine, a base frame, a support member mounted for nutational movements on said base frame, a thrust bearing in said support member, means restraining said support member from rotational movements relative to said base frame, brace members fastened to and extending upwardly from said support member, an imperforate tub fastened to and supported by

BEST AVAILABLE COPY l brace members, bearing means in said tub, rotatable ft means journalled in said bearing means and supted in said thrust bearing, an agitator shaft within l rotatable shaft means, and a perforate basket nested hin said tub and connected to said rotatable shaft ans for rotational movements relative to said tub.

. In a washing machine, a base frame, a support nber mounted for nutational movements on said base ne, a thrust bearing in said support member, means raining said support member from rotational moveits relative to said base frame, brace members fas-d to and extending upwardly from said support mem-, an imperforate tub fastened to and supported by l brace members, bearing means in said tub, rotatable ft means journalled in said bearing means and in said ist bearing to support the thrust thereon independent-of said tub, and a perforate basket nested in said and connected to said rotatable shaft means for tional movements relative to said tub, said rotatable ft means journaling therein an agitator shaft extend-into said perforate basket.

. In a washing machine provided with a base frame uding mounting structure, a tub assembly comprisa support member supported by said mounting struc-and centered thereon for nutational movements tive to said base frame, brace members fastened to extending upwardly from said support member, an erforate tub fastened to and supported by said brace nbers, a perforate basket nested within said tub, a al bearing in said tub, a rotatable drive tube coned to said basket and journalled in said bearing for ting said basket and nutating with said tub, an agitawithin said basket, and an agitator shaft journalled in tube and connected to said agitator.

In a washing machine provided with a base frame ding mounting structure, a tub assembly comprising, pport member mating with said mounting structure centered thereon for nutational movements relative aid base frame, brace members fastened to and exing upwardly from said support member, an imperte tub fastened to and supported by said brace mem-, a perforate basket nested within said tub, a radial ing in said tub, a thrust bearing in said support memshaft means supported in said thrust bearing for ron relative to said support member, said shaft means ding a stub shaft journalled in said radial bearand connected to said basket.

In a washing machine provided with a base frame ding mounting structure, a tub assembly comprisa support member mating with said mounting struc-and centered thereon for nutational movements tive to said base frame, brace members fastened to extending upwardly from said support member, an erforate tub fastened to and supported by said brace nbers, a perforate basket nested within said tub, a al bearing in said tub, a thrust bearing in said supmember, shaft means supported in said thrust bearfor rotation relative to said support member, said t means including a stub shaft journalled in said al bearing and connected to said basket, an agitator in said basket, and an agitator shaft connected to agitator and journalled in said stub shaft.

In a washing machine of the vertical axis type, pstanding non-rotatable tub adapted to receive fluid, ase frame, friction damping means on said base e, a support member engaging and supported on damping means for movement relative thereto, a ality of brace members fastened to and connected een said support member and said tub to support weight of said tub and its fluid contents on said supmember to produce a frictional force resisting relamovement between said support member and said ion damping means, said brace members forming a ry structure with said tub and said support member, a revoluble perforate basket nested within said tub, a self-aligning bearing mounted in said tub, shaft means connected to said basket and journalled in said self-aligning bearing, a thrust bearing in said support member supporting said shaft means and the weight of said basket independently of said tub, and means for resiliently centering said unitary structure on said damping means for nutational movement relative to said base frame.

7. In a washing machine, a tub for receiving fluid, a support member, brace members fastened to and connected between said tub and said support member to form a unitary structure, a base frame, a thrust bearing in said support member, a self-aligning bearing in said tub, a clothes basket nested within said tub, revoluble shaft means connected to said basket and journalled in both of said bearings for rotating said basket and supporting its weight in said thrust bearing, friction damping means on said base frame, said friction damping means being located between said support member and said base frame and contacting said support member to resist movement of said unitary structure and said shaft means relative to said base frame, said support member supporting the weight of said tub and its fluid contents on said friction damping means, and means connected between said base frame and said unitary structure for resiliently positioning said tub relative to said base frame.

8. In a washing machine, a tub for receiving washing fluid, a clothes basket within said tub, a base frame, friction damping means on said base frame, a support member engaging and supported on said friction damping means for movement relative to said base frame, brace members connected between said tub and said support member to support the weight of said tub and its fluid contents on said support member, a radial bearing in said tub, a thrust bearing in said support member, revoluble shaft means connected to basket and received in both of said bearings for rotating said basket and for supporting its weight in said thrust bearing independently of said brace members, and means for resiliently maintaining said support member in a centered relationship on said friction damping means.

*9. In a washing machine, a base frame, a support member mounted for nutational movements on said base frame, a thrust bearing in said support member, means restraining said support member from rotational movements relative to said base frame, at least one brace member fastened to and extending upwardly from said support member, an imperforate tub fastened to and supported by said brace member, bearing means in said tub, rotatable shaft means journalled in said bearing means and supported in said thrust bearing, an agitator shaft within said rotatable shaft means, and a perforate basket nested within said tub and connected to said rotatable shaft means for rotational movements relative to said tub.*

*10. In a washing machine, a tub for receiving washing fluid, a clothes basket within said tub, a base frame, friction damping means on said base frame, a support member engaging and supported on said friction damping means for movement relative to said base frame, at least one brace member connected between said tub and said support member to support the weight of said tub and its fluid contents on said support member, bearing means including a thrust bearing in said support member, revoluble shaft means connected to said basket for rotating said basket and received in said thrust bearing for supporting the weight of said basket, and means for resiliently maintaining said support member in a centered relationship on said friction damping means.*

*11. In a washing machine, an imperforate tub for receiving washing fluid, a base frame, a support member mounted for nutational movements on said base frame, bearing means including a thrust bearing in said support member, brace means extending upwardly from said sup-*

*port member and fastened to said support member and said tub to place the weight of said tub and its fluid contents on said support member, a clothes basket within said tub, and revoluble shaft means connected to said basket for rotating said basket and received in said thrust bearing for supporting the weight of said basket.*

*12. In a washing machine, a base frame, a support member mounted for nutational movements on said base frame, an imperforate tub above and in spaced relationship to said support member for receiving washing fluids, brace means extending upwardly from said support member and fastened to said support member and said tub to place the weight of said tub and its fluid contents on said support member, a revoluble clothes basket within said tub, bearing means including a thrust bearing in said support member, revoluble shaft means connected to*

*said basket for rotating said basket and received in said thrust bearing for supporting the weight of said basket, agitation means within said basket, and drive means constructed and disposed to actuate said agitation means.*

References Cited in the file of this patent
or the original patent

UNITED STATES PATENTS

| | | |
|---|---|---|
| 1,991,793 | Cureton | Feb. 19, 1935 |
| 2,001,550 | Shaum | May 14, 1935 |
| 2,555,400 | De Remer | June 5, 1951 |
| 2,605,628 | Smith | Aug. 5, 1952 |
| 2,645,108 | Smith | July 14, 1953 |
| 2,665,007 | Hallander | Jan. 5, 1954 |
| 2,700,473 | Emmert et al. | Jan. 25, 1955 |
| 2,836,993 | Johnson et al. | June 3, 1958 |